(12) United States Patent
Yoon (10) Patent No.: US 10,514,544 B1
(45) Date of Patent: Dec. 24, 2019

(54) TILTED DISPLAYS FOR A WIDE FIELD OF VIEW

(71) Applicant: Facebook Technologies, LLC, Menlo Park, CA (US)

(72) Inventor: Youngshik Yoon, Cupertino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/801,227

(22) Filed: Nov. 1, 2017

(51) Int. Cl.
*G09F 7/02* (2006.01)
*G02B 27/01* (2006.01)
*G02B 3/08* (2006.01)

(52) U.S. Cl.
CPC .......... *G02B 27/0172* (2013.01); *G02B 3/08* (2013.01); *G02B 27/017* (2013.01); *G02B 2027/0178* (2013.01)

(58) Field of Classification Search
CPC .............. G02B 27/017; G02B 27/0093; G02B 27/0176; G02B 7/023; G02B 3/08
USPC ............. 40/611.07; 345/8; 351/204; 359/630
See application file for complete search history.

(56) References Cited

U.S. PATENT DOCUMENTS

| 6,538,624 | B1 * | 3/2003 | Karasawa | .......... G02B 27/0176 345/8 |
| 9,454,010 | B1 | 9/2016 | Passmore et al. | |
| 2002/0181115 | A1 * | 12/2002 | Massof | ................ G02B 27/017 359/630 |
| 2006/0168859 | A1 * | 8/2006 | Pombo | .................... G02B 7/023 40/611.07 |
| 2016/0198949 | A1 * | 7/2016 | Spitzer | ................ G02B 27/0093 351/204 |
| 2017/0192240 | A1 * | 7/2017 | Drinkwater | ........ G02B 27/0176 |
| 2017/0336539 | A1 * | 11/2017 | Perreault | .................. G02B 3/08 |

* cited by examiner

*Primary Examiner* — Abdul-Samad A Adediran
(74) *Attorney, Agent, or Firm* — Morgan, Lewis & Bockius LLP (57) ABSTRACT

A head-mounted display device includes a first set of one or more display elements defining a first plane and a second set of one or more display elements defining a second plane that is not parallel to the first plane. The display device also includes a first set of one or more lenses defining a third plane and configured to transmit light from the first set of one or more display elements toward a first eye of a user, and a second set of one or more lenses defining a fourth that is not parallel to the third plane, and configured to transmit light from the second set of one or more display elements toward a second eye of the user. The second set of one or more lenses is distinct and separate from the first set of one or more lenses.

20 Claims, 8 Drawing Sheets

TILTED DISPLAYS FOR A WIDE FIELD OF VIEW

RELATED APPLICATIONS

Technical Field

This relates generally to displays, and more specifically to displays used in head-mounted display devices.

BACKGROUND

Head-mounted display devices (also called herein head-mounted displays) are gaining popularity as means for providing visual information to users. For improving immersiveness of a virtual reality experience, there is a need for head-mounted display devices that provide a wider field of view.

SUMMARY

A wider field of view improves immersiveness in a virtual reality experience, and enhances users' overall enjoyment of head-mounted display devices. Head-mounted display devices also have a limited size and weight, and therefore there is a need for compact and light optical systems providing a wide field of view.

The above deficiencies and other problems associated with conventional display devices are reduced or eliminated with the disclosed tilted display devices. In some embodiments, the display device is a head-mounted display device. In some embodiments, the device is portable.

In accordance with some embodiments, a head-mounted display device includes a first set of one or more display elements and a second set of one or more display elements. The first set of one or more display elements defines a first plane, and the second set of one or more display elements defines a second plane that is not parallel to the first plane. The display device also includes a first set of one or more lenses configured to transmit light from the first set of one or more display elements toward a first eye of a user. The first set of one or more lenses defines a third plane. The display device further includes a second set of one or more lenses configured to transmit light from the second set of one or more display elements toward a second eye of the user. The second set of one or more lenses is distinct and separate from the first set of one or more lenses. The second set of one or more lenses defines a fourth plane that is not parallel to the third plane.

In accordance with some embodiments, a method includes transmitting a first light pattern from a first set of one or more display elements and transmitting a second light pattern from a second set of one or more display elements. The first set of one or more display elements defines a first plane and the second set of one or more display elements define a second plane that is not parallel to the first plane. The method also includes directing the first light pattern from the first set of one or more display elements toward a first eye of a user and directing the second light pattern from the second set of one or more display elements toward a second eye of the user. The first set of one or more lenses defines a third plane and the second set of one or more lenses defines a fourth plane that is not parallel to the third plane. The second set of one or more lenses is distinct and separate from the first set of one or more lenses.

Thus, the disclosed embodiments provide compact and light head-mounted display devices with a wider field of view in the temporal area.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

These figures are not drawn to scale unless indicated otherwise.

DETAILED DESCRIPTION

Field of view of a human includes a binocular view area and a temporal monocular view area. The binocular view area has a horizontal field of view on the order of 120 degrees. The temporal monocular view area has a horizontal field of view on the order of 190 degrees. The temporal monocular field of view is further increased by eye rotation to be on the order of 220 degrees.

Conventional head-mounted displays typically have one or two flat displays positioned in parallel to a user's eyes. Such conventional displays have a limited field of view, especially in the temporal area. A typical field of view of head-mounted display devices horizontally ranges between 100 and 120 degrees. As explained above, the maximum field of view of humans is on the order of 220 degrees when eye rotation is taken into account. Therefore, the field of view of conventional display devices restricts the user's perception of a virtual reality view and decreases the immersiveness of the virtual reality experience.

A display device disclosed herein includes displays and lenses in a tilted configuration. Such configuration increases the field of view in the temporal area. The disclosed displays are also compact, and therefore comfortable for a user to wear.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lens.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
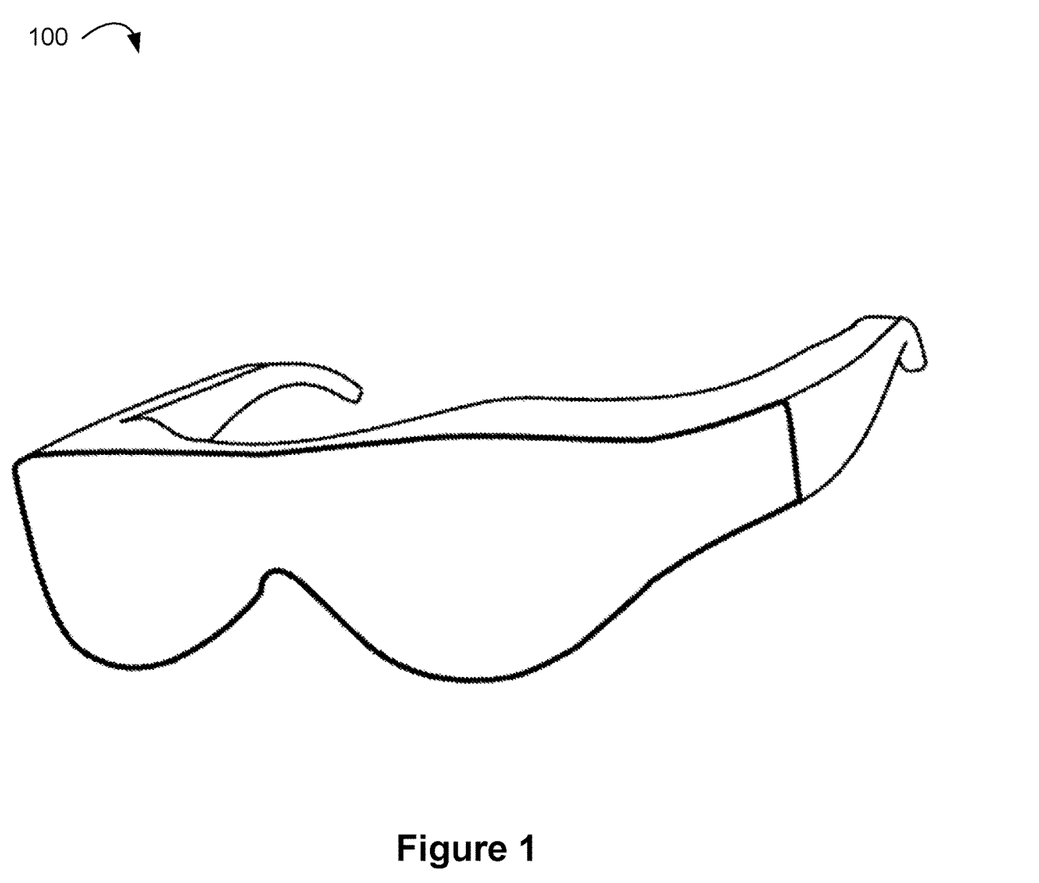
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2A. In some embodiments, display device 100 includes additional components not shown in FIG. 2A.

Figure 2A:
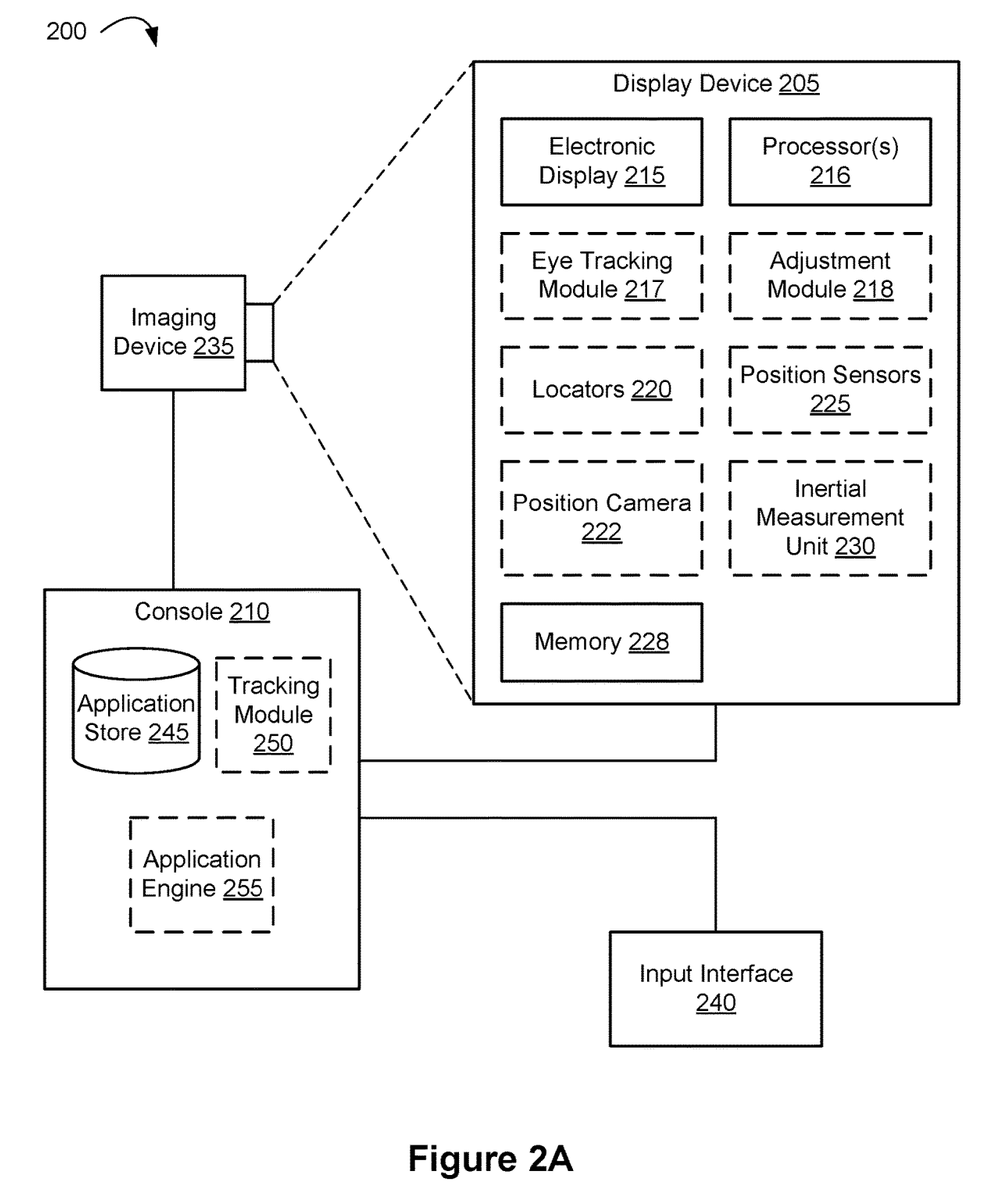
FIG. 2A is a block diagram of a system including a display device in accordance with some embodiments.

FIG. 2A is a block diagram of system 200 in accordance with some embodiments. The system 200 shown in FIG. 2A includes display device 205 (which corresponds to display device 100 shown in FIG. 1), imaging device 235, and input interface 240 that are each coupled to console 210. While FIG. 2A shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging device 235 communicating with console 210. In alternative configurations, different and/or additional components may be included in system 200. For example, in some embodiments, console 210 is connected via a network (e.g., a LAN, WAN, the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 may operate as a virtual reality (VR) device, an AR device, as glasses or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may include a single adjustable electronic display element or multiple adjustable electronic displays elements (e.g., a display for each eye of a user).

In some embodiments, the display element includes one or more light emission devices and a corresponding emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, a laser, a fluorescent light source, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximate to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to also determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together, thus, a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is otherwise sufficiently transparent to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is generally transparent in the IR band but opaque in the visible band.

Inertial Measurement Unit (IMU) 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. The calibration parameters include, for example, parameters defining orientation (e.g., horizontal vs. vertical orientation) and/or direction in relation to a position of display device 205 (e.g., forward, backward, left and right). Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Optionally, imaging device 235 is configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, a touch controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2A, console 210 includes application store 245, tracking module 250, and application engine 255. Some embodiments of console 210 have different modules than those described in conjunction with FIG. 2A. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, educational applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 2B:
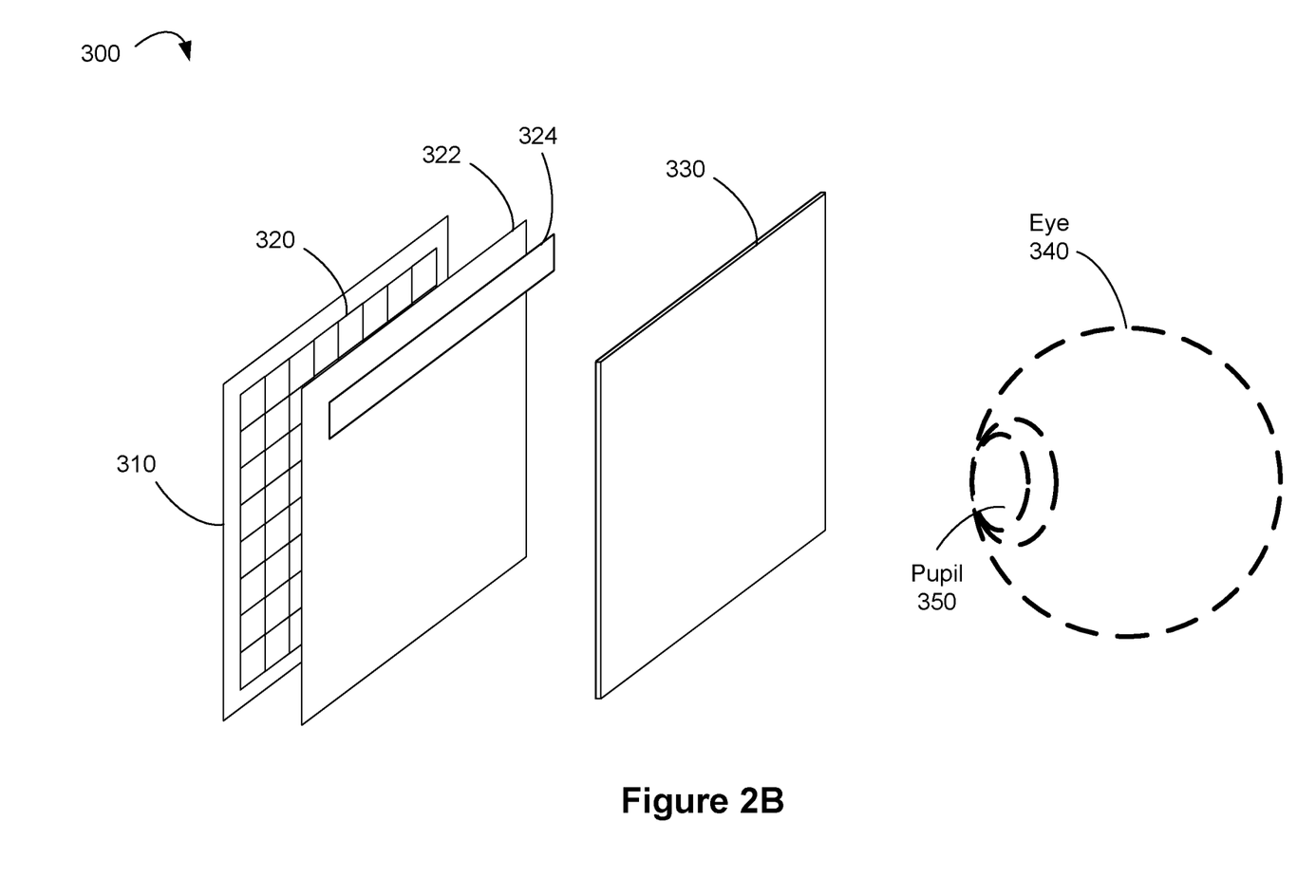
FIG. 2B is an isometric view of a display device in accordance with some embodiments.

FIG. 2B is an isometric view of display device 300 in accordance with some embodiments. In some other embodiments, display device 300 is part of some other electronic display (e.g., digital microscope, a mobile device, a smartphone etc.). In some embodiments, display device 300 includes light emission device array 310, and one or more lenses 330. In some embodiments, display device 300 also includes emission intensity array 322 and IR detector array 324.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

Emission intensity array 322 is configured to selectively attenuate light emitted from light emission array 310. In some embodiments, emission intensity array 322 is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation and/or at some intermediate level of attenuation. In this manner emission intensity array 322 is able to control what portion of the image light emitted from light emission device array 310 is passed to the one or more lenses 330. In some embodiments, display device 300 uses emission intensity array 322 to facilitate providing image light to a location of pupil 350 of eye 340 of a user, and to minimize the amount of image light provided to other areas in the eyebox.

One or more lenses 330 receive the modified image light (e.g., attenuated light) from emission intensity array 322 (or directly from emission device array 310), and direct the shifted image light to a location of pupil 350.

Optional IR detector array 324 detects IR light that has been retro-reflected from the retina of eye 340, a cornea of eye 340, a crystalline lens of eye 340, or some combination thereof. IR detector array 324 includes either a single IR sensor or a plurality of IR sensitive detectors (e.g., photodiodes). In some embodiments, IR detector array 324 is separate from light emission device array 310. In some embodiments, IR detector array 324 is integrated into light emission device array 310.

In some embodiments, light emission device array 310 and emission intensity array 322 make up a display element. Alternatively, the display element includes light emission device array 310 (e.g., when light emission device array 310 includes individually adjustable pixels) without emission intensity array 322. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

Figure 3A:
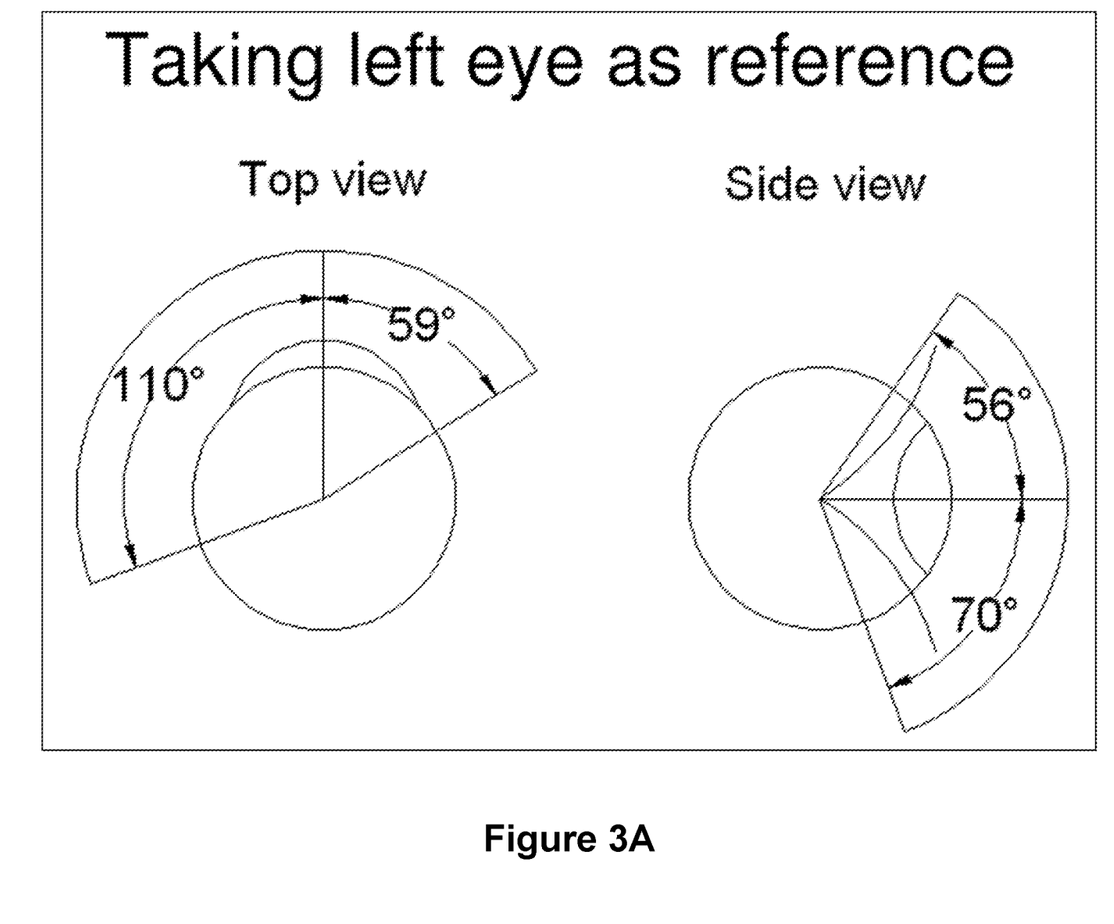
FIG. 3A illustrates the field of view of a human's left eye in accordance with some embodiments.

FIG. 3A illustrates the field view for a human's left eye. As illustrated in the top-view image of the eye shown in FIG. 3B, the field of view of a human eye is asymmetric with respect to a vertical reference line passing through the center of the pupil. The field of view of the left eye extends 59 degrees toward the right (i.e., field of view in the nasal area) and 110 degrees toward the left (i.e., field of view in the temporal area). The side-view image in FIG. 3A illustrates the field of view in the vertical direction. The field of view extends 56 degrees up and 70 degrees down from a horizontal reference line passing through the center of the pupil.

Figure 3B:
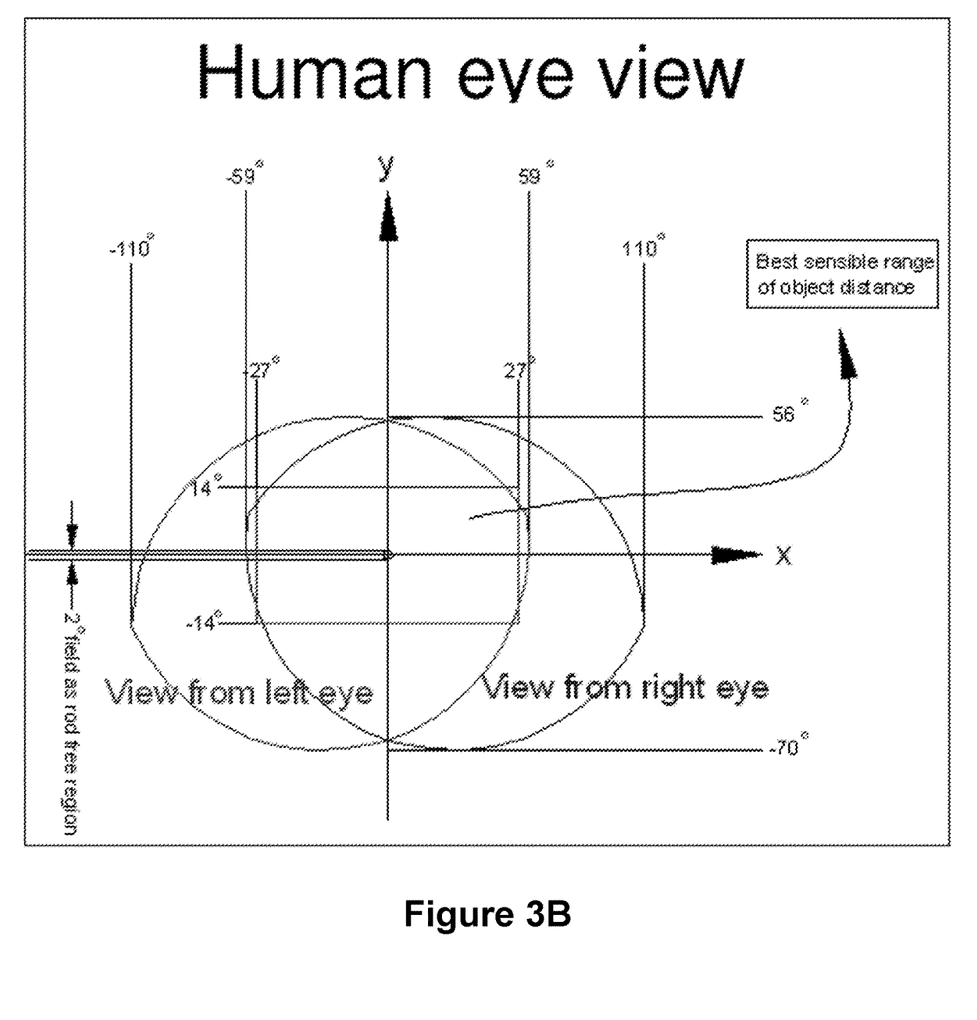
FIG. 3B illustrates the binocular field of view of a human in accordance with some embodiments.

FIG. 3B illustrates the binocular field of view of a human. The field of view of the left eye extends −110 degrees from the y-axis toward the left and 59 degrees from the y-axis toward the right. The field of view of the right eye extends 110 degrees from the y-axis toward the right and −59 degrees from the y-axis toward the left. A range for depth sensible vision is from −59 degrees to 59 degrees (i.e., the area where the field of view of the left and the right eye overlap). A range for most optimal depth sensible vision is from −27 degrees to 27 degrees. As explained above, the binocular field of view of a human is on the order of 220 degrees. The left and right temporal areas range respectively from −59 and 59 degrees to −110 and 110 degrees. The schematic illustration of FIG. 3B assumes that the left eye and the right eye lie on a flat reference plane. However, in reality human faces have varying shapes that affect the field of view.

Figure 4:
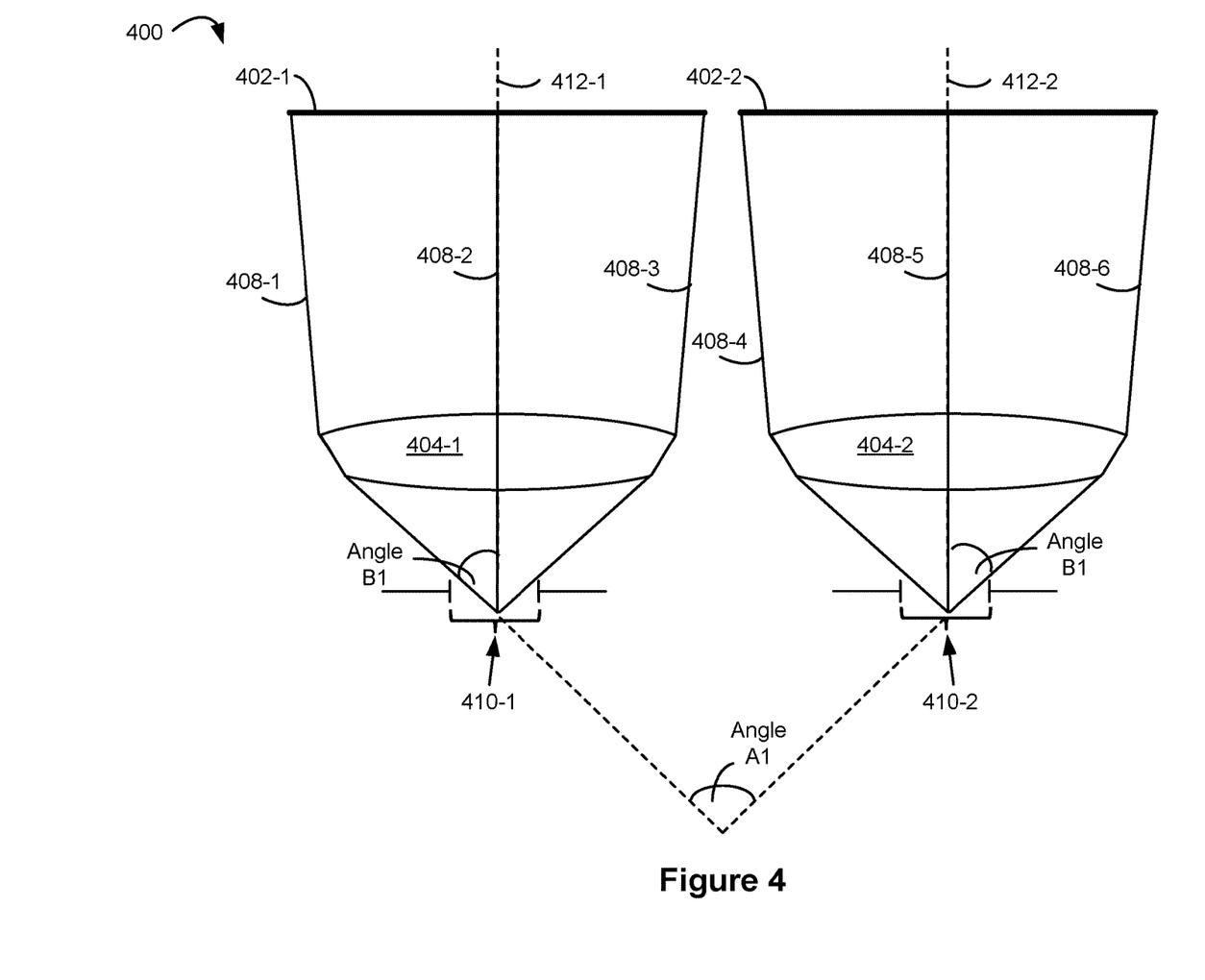
FIG. 4 is a schematic illustration of a top-view of a conventional display device in accordance with some embodiments.

FIG. 4 is a schematic illustration of a top-view of conventional display device 400 in accordance with some embodiments. Display device 400 corresponds to display device 300 described above with respect to FIG. 2B. Display device 400 includes display 402-1 and display 402-2. Display 402-1 is positioned in front of reference pupil 410-1. Reference pupil 410-1 corresponds to a left eye of a user. Display 402-1 defines display optical axis 412-1, which passes through the middle of display 402-1 and is normal to the surface of display 402-1. Display optical axis 412-1 passes through the center of reference pupil 410-1 and corresponds to the reference axis of reference pupil 410-1 that is surface normal to reference pupil 410-1 and passes through the center of reference pupil 410-1. Display 402-2 is positioned in front of reference pupil 410-2. Reference pupil 410-2 corresponds to the right eye of a user. Display 402-2 defines display optical axis 412-2, which passes through the center of display 402-2 and is normal to the surface of display 402-2. Display optical axis 412-2 passes through the center of reference pupil 410-2 and corresponds to the reference axis of reference pupil 410-1 that is surface normal to reference pupil 410-1 and passes through the center of reference pupil 410-1. Displays 402-1 and 402-1 are distinct and separate from each other. In some embodiments, displays 402-1 and 402-2 are adjacent to each other. In some embodiments, displays 402-1 and 402-2 are portions of a single display. Displays 402-1 and 402-2 are aligned horizontally in a 180 degree angle forming a plane. Display 402-1 is configured to emit light (e.g., rays 408-1, 408-2, and 408-3) toward reference pupil 410-1 (i.e., a left eye) and display 402-3 is configured to emit light (e.g., rays 408-4, 408-5, and 408-6) toward reference pupil 410-2 (i.e., a right eye).

Conventional display device 400 also includes lenses 404-1 and 404-2. Lenses 404-1 and 404-2 are identical. Lens 404-1 is positioned between display 402-1 and reference pupil 410-1, and directs rays 408-1, 408-2, and 408-3 toward reference pupil 410-1. Lens 404-2 is positioned between display 402-2 and reference pupil 410-2, and directs rays 408-4, 408-5, and 408-6 toward reference pupil 410-2. Lenses 404-1 and 404-2 are aligned parallel to displays 402-1 and 402-2. Lenses 404-1 and 404-2 define optical axes that overlap with display optical axes 412-1 and 412-2, respectively.

Conventional display device 400 has a field of view of 110 degrees illustrated by angle A1 in FIG. 4. As explained above, this is significantly less than the field of view of a human which is of the order of 220 degrees. Therefore, there is a need for display devices that provide a wider field of view in the temporal direction. The temporal area of the field of view is illustrated by angles B1, which are angles defined by outermost rays 408-1 and 408-6 and reference axes of reference pupils 410-1 and 410-2, respectively. The reference axes of reference pupil 410-1 and 410-2 correspond to display optical axes 412-1 and 412-2 in FIG. 4, and are surface normals to reference pupils 410-1 and 410-2 passing through the centers of the corresponding reference pupils. Angle B1 in FIG. 4 is 55 degrees.

Figure 5:
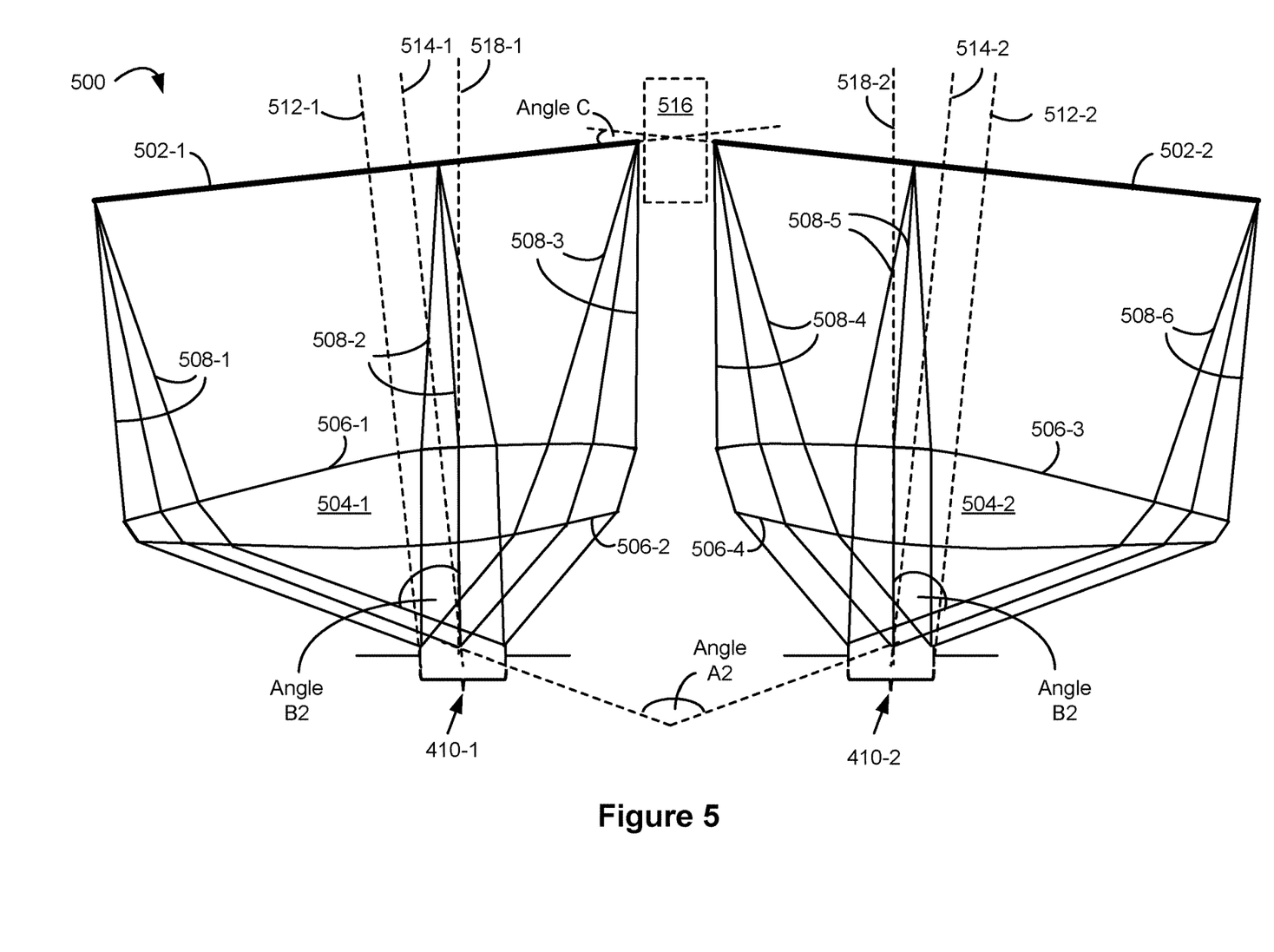
FIG. 5 is a schematic illustration of a top-view of a display device in accordance with some embodiments.

As illustrated in FIG. 4, conventional display devices do not provide field of view that covers the natural field of view of a human. FIG. 5 is a schematic illustration of a top-view of display device 500 in accordance with some embodiments. Display device 500 corresponds to display device 400 described above with respect to FIG. 4, except that display device 500 includes tilted displays 502-1 and 502-2 and tilted lenses 504-1 and 504-2. The configuration of display device 500 is based on the asymmetric field of view of a human eye, as illustrated above with respect to FIGS. 3A and 3B. In some embodiments, display device 500 includes a first set of one or more displays (e.g., including display 502-1), a second set of one or more displays (e.g., including display 502-2), a first set of one or more lenses (e.g., including lens 504-1) and a second set of one or more lenses (e.g., including lens 504-2).

In FIG. 5, displays 502-1 and 502-2 are distinct and separate from each other. In some embodiments, displays 502-1 and 502-2 are adjacent to each other. Display 502-1 is positioned in front of reference pupil 410-1. Display 502-1 defines display optical axis 512-1, which passes through the center of display 502-1 and is normal to the surface of display 502-1. Reference line 518-1 passes through the center of reference pupil 410-1 and is perpendicular to a plane defined by reference pupils 410-1 and 410-2. Similarly, display 502-2 is positioned in front of reference pupil 410-2. Display 502-2 defines display optical axis 512-2, which passes through the center of display 502-2 and is normal to the surface of display 502-2. Reference line 518-2 passes through the center of reference pupil 410-2 and is perpendicular to the plane defined by reference pupils 410-1 and 410-2. Display 502-1 is configured to emit light (e.g., rays 508-1, 508-2, and 508-3) toward reference pupil 410-1 (i.e., a left eye) and display 502-2 is configured to emit light (e.g., rays 508-4, 508-5, and 508-6) toward reference pupil 410-2 (i.e., a right eye). In some embodiments, display 502-1 is separated from display device 502-2 by at least 3 mm, at least 4 mm, at least 5 mm, at least 6 mm, at least 7 mm, or by at least 8 mm. In some embodiments, display 502-1 is separated from display device 502-2 by at least 3 mm. The separation optionally allows space for installation of one or more additional components 516. In some embodiments, component 516 is a camera (e.g., position camera 222 described above with respect to FIG. 2A). In some embodiments, component 516 includes one or more of a light source, a reflector, other optical detector, or a sensor. In some embodiments, component 516 is a depth-sensing device (e.g., a depth-sensing camera). However, the separation between display device 502-1 and 502-2 is limited, because too large of a separation may increase the overall width of the display device and decrease field of view in the nasal area. Display devices 502-1 and 502-2 are not positioned parallel to each other. Instead, display 502-1 intersects with display 502-2 at an angle of 12 degrees, illustrated as angle C. In some embodiments, angle C is at least 2 degrees, at least 4 degrees, at least 6 degrees, at least 8 degrees, at least 10 degrees, at least 12 degrees, at least 14 degrees, at least 16 degrees, at least 18 degrees, at least 20 degrees, at least 22 degrees, at least 24 degrees, at least 26 degrees, at least 28 degrees, at least 30 degrees, or at least 32 degrees. In some embodiments, angle C is not more than 30 degrees, not more than 30 degrees, not more than 28 degrees, not more than 26 degrees, not more than 24 degrees, not more than 22 degrees, not more than 20 degrees, not more than 18 degrees, not more than 16 degrees, not more than 14 degrees, not more than 12 degrees, or not more than 10 degrees.

Display device 500 also includes lenses 504-1 and 504-2. Lens 504-1 is positioned between display 502-1 and reference pupil 410-1 and directs rays 508-1, 508-2, and 508-3 toward reference pupil 410-1. Lens 504-2 is positioned between display 502-2 and reference pupil 410-2, and directs rays 508-4, 508-5, and 508-6 toward reference pupil 410-2. Lens 504-1 is parallel to display 502-1 and lens 504-2 is parallel to display 502-2. Lenses 504-1 and 504-2 are asymmetric Fresnel lenses with respective Fresnel surfaces facing displays 502-1 and 502-2. Fresnel lenses, having multiple concentric annular sections that are offset from one another (e.g., for a circular lens), provide apertures and focal lengths comparable to conventional lenses, but are typically thinner and lighter than conventional lenses of similar performance features (e.g., aperture and/or focal length). Fresnel surfaces provide good control of overall aberration over wide field of views. Lens 504-1 includes surface 506-1 and surface 506-2 that is opposite to surface 506-1. Surface 506-1 includes a plurality of Fresnel structures and is facing toward display 502-1. In some embodiments, the plurality of Fresnel structures has dynamically changing draft angles that can reduce aberration over a wide field of view. Surface 506-2 is an aspheric surface. In some embodiments, surface 506-2 is a low order aspheric surface (e.g., 6th order aspheric surface) and configured to correct for chromatic aberrations. In some embodiments, the asymmetric curved shape of lenses 504-1 and 504-2 reduces pupil swim effect (i.e., a distortion of an image while eye rotates). Lens 504-1 is configured to direct rays 508-1, 508-2, and 503-3 emitted by display 502-1 toward reference pupil 410-1 when lens 504-1 is tilted compared to the surface of reference pupil 410-1. Lens 504-1 defines lens optical axis 514-1, which is distinct and separate from a geometric center of lens 504-1. Similarly, lens 504-2 includes surface 506-3 and surface 506-4 that is opposite to surface 506-3. Surface 506-3 includes a plurality of Fresnel structures and is facing toward display 502-2. Surface 506-4 is an aspheric surface and corresponds to surface 506-2. Lens 504-2 defines lens optical axis 514-2 which is distinct and separate from a geometric center of lens 504-2. Lens 504-2 is configured to direct rays 508-4, 508-5, and 503-6 emitted by display 502-2 toward reference pupil 410-2 when lens 504-1 is tilted compared to the surface of reference pupil 410-1.

Lenses 504-1 and 504-2 are made of an optically transparent material. Further requirements for the materials include applicability for processing by precision molding techniques and a relatively high refractive index for correction of chromatic aberration. In some embodiments, lenses 504-1 and 504-2 are made of poly(methyl methacrylate) PMMA or cyclo olefin polymer (COP) optical polymers (e.g., E48R by ZEONEX®). Light weight and lens thickness are also criteria for selecting an appropriate lens material.

Display reference axis 512-1 defined by display 502-1 is laterally offset from lens optical axis 514-1 defined by lens 504-1 away from the center of display device 500 toward left temporal direction. Display reference axis 512-2 defined by display 502-2 is laterally offset from lens optical axis 514-2 defined by lens 504-2 away from the center of display device 500 toward right temporal direction. In FIG. 5, display 502-1 is laterally shifted by 2 mm toward left and display 502-2 is laterally shifted by 2 mm toward right. In some embodiments, the offset is by at least 1 mm (e.g., 1 mm, 2 mm, 3 mm, 4 mm, 5 mm, etc.). The shifting of displays 502-1 and 502-2 further away from the center of display device 500 widens the field of view.

The tilted display configuration of display device 500 illustrated in FIG. 5 provides an increased field of view in the temporal area compared to conventional display devices, such as display device 400, without increasing the size of the display device. In FIG. 5, the field of view, illustrated by angle A2, is 140 degrees. By tilting displays 502-1 and 502-2 and lenses 504-1 and 504-2 in parallel to the corresponding displays 502-1 and 502-2 the outermost light rays 508-1 and 508-6 are transmitted toward respective reference pupils 410-1 and 410-2 in a steeper angle, thereby widening angle A2. In some embodiments, angle A2 ranges from 120-130 degrees, 130-140 degrees, or 140-150 degrees. For comparison, the field of view illustrated by angle A1 in FIG. 4 is 110 degrees. More specifically, the temporal area of the field of view is illustrated by angles B2. Angles B2 illustrate angles defined by outermost rays 508-1 and 508-6 and reference lines 518-1 and 518-2 of corresponding reference pupils 410-1 and 410-2, respectively. In FIG. 5 angles B2 are 70 degrees. For comparison, the corresponding angle B1 of FIG. 4 is 55 degrees.

Coincidently, the tilted configuration of display device 500 allows a shorter distance between lenses 504-1 and 504-2 and corresponding displays 502-1 and 502-2 compared to the conventional configuration of display device 400. For example, the distance between lens 504-1 and display 502-1 can be up to 20% shorter than the distance between lens 404-1 and display 402-1. The tilted configuration also allows a shorter total width of display device 500, measured as a distance between left edge of display 502-1 and right edge of display 502-2. For example, the total width of display device 500 can be up to 20% shorter than the total width of conventional display device 400.

Furthermore, the separation and/or tilting of displays 502-1 and 502-2 provides more space in the nasal area of display device 500, which allows insertion of optional additional components. In some embodiments, display device 500 optionally includes one or more components 516 positioned in the space between displays 502-1 and 502-2. In some embodiments, component 516 is a camera (e.g., position camera 222 described above with respect to FIG. 2A). In some embodiments, component 516 includes one or more of a light source, a reflector, other optical detector, or a sensor.

In summary, the tilted display configuration of display device 500 provides an increased field of view without compromising the size of the display device. Instead, in some embodiments, the tilted configuration can decrease the size (e.g., the width or the depth) of a display device. Furthermore, the tilted configuration provides additional space between displays 502-1 and 502-2, optionally allowing installation of one or more additional components 516. The overall configuration of display device 500 including the tilt angle of displays 502-1 and 502-2 and lenses 504-1 and 504-2 (i.e., angle C in FIG. 5), separation between displays 502-1 and 502-2, the lateral offset of display reference axes 512-1 and 512-2 from respective lens optical axes 514-1 and 514-2, and distance between displays 502-1 and 502-2 and respective lenses 504-1 and 504-2 is optimized to an improved field of view in the temporal area, and additional space between the displays for positioning of additional components (e.g., additional components 516), without compromising the field of view in the nasal area, or overall size of the display device. For example, increased tilt angle of displays 502-1 and 502-2 or increased separation between displays 502-1 and 502-2 can decrease field of view in the nasal area while improving field of view in the temporal area. As another example, decreased distance between displays 502-1 and 502-2 and respective lenses 504-1 and 504-2 can decrease field of view in the temporal areas while decreasing the overall depth of the display device. Additionally, in some embodiments, the configuration and/or alignment of display device 500 is adjusted in accordance with a shape of a human face. In some embodiments, the configuration and/or alignment of display device 500 is adjusted in accordance with a shape of a user's face.

Figure 6:
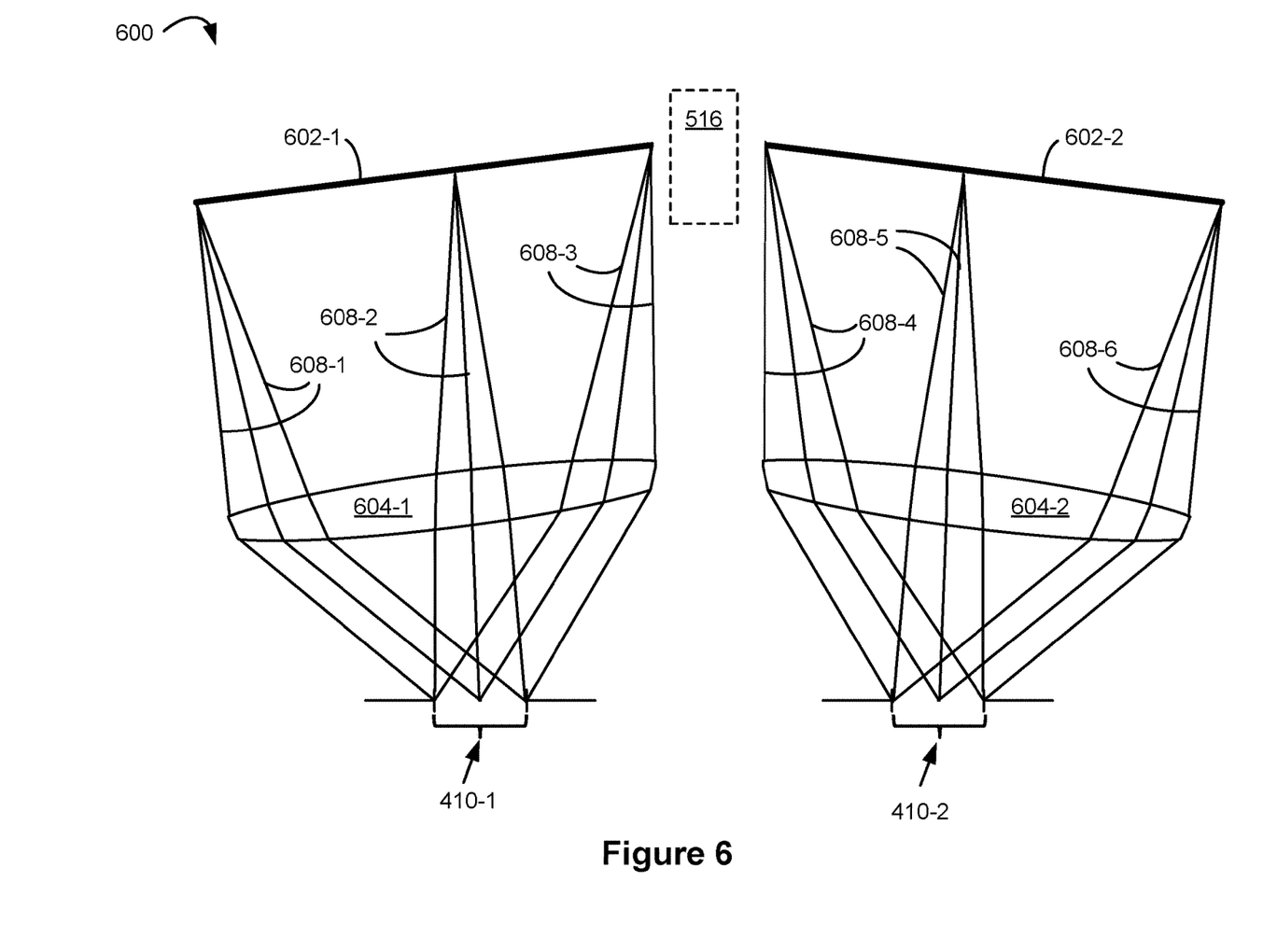
FIG. 6 is a schematic illustration of a top-view of a display device in accordance with some embodiments.

FIG. 6 is a schematic illustration of a top-view of display device 600 in accordance with some embodiments. Display device 600 corresponds to display device 500 described above with respect to FIG. 5, except that lenses 604-1 and 604-2 are symmetric lenses. Symmetric lenses 604-1 and 604-2 direct rays 608-1, 608-2, and 608-3 and rays 608-4, 608-5, and 608-6 emitted by respective displays 602-1 and 602-2, toward reference pupils 410-1 and 410-2, respectively. In some embodiments, lenses 604-1 and 604-2 are Fresnel lenses including surfaces with a plurality of Fresnel structures, as described above with respect to surfaces 506-1 and 506-3 of FIG. 5. Display device 600 provides an improved field of view compared to conventional display device 400. Display device 600 also provides for additional space in the nasal area between displays 602-1 and 602-2. However, to achieve an increased field of view with symmetric lenses 604-1 and 604-2 as compared to asymmetric lenses 504-1 and 504-2, display device 600 requires further distance between lenses 604-1 and 604-2 and their corresponding reference pupils 410-1 and 410-2. This can impact the overall size of a display device. In addition, displays 602-1 and 602-2 have a shorter width compared to displays 502-1 and 502-2, which can impact the overall field of view.

In light of these principles, we now turn to certain embodiments of a head-mounted display device.

In accordance with some embodiments, a head-mounted display device includes a first set of one or more display elements, the first set of one or more display elements and a second set of one or more display elements. The first set of one or more display elements defines a first plane, and the second set of one or more display elements defines a second plane that is not parallel to the first plane. For example, display device 500 includes displays 502-1 and 502-2 in FIG. 5. Display 502-1 defines a first plane and display 502-2 defines a second plane. Display 502-2 is not parallel to display 502-1. The display device also includes a first set of one or more lenses configured to transmit light from the first set of one or more display elements toward a first eye of a user. The first set of one or more lenses defines a third plane. The display device further includes a second set of one or more lenses configured to transmit light from the second set of one or more display elements toward a second eye of the user. The second set of one or more lenses is distinct and separate from the first set of one or more lenses. The second set of one or more lenses defines a fourth plane that is not parallel to the third plane. For example, display device 500 also includes lenses 504-1 and 504-2. Lens 504-1 defines a third plane and lens 504-2 defines a fourth plane. Lens 504-2 is distinct and separate from lens 504-1. Lens 504-2 is not parallel to lens 504-1. Lens 504-1 is configured to transmit light (e.g., rays 508-1, 508-2 and 508-3) toward reference pupil 410-1 corresponding to a left eye of a user. Lens 504-2 is configured to transmit light (e.g., rays 508-4, 508-5, and 508-6) toward reference pupil 410-2 corresponding to a right eye of a user.

In some embodiments, the first set of one or more lenses includes a first Fresnel lens, and the second set of one or more lenses includes a second Fresnel lens that is distinct and separate from the first Fresnel lens. For example, lenses 504-1 and 504-2 are Fresnel lenses in FIG. 5.

In some embodiments, the first Fresnel lens has a first Fresnel surface that includes a plurality of Fresnel structures and a first non-Fresnel surface that is opposite to the first Fresnel surface (e.g., lens 504-1 has surface 506-1 that includes a plurality of Fresnel structures and surface 506-2 that is opposite to surface 506-1 in FIG. 5). The second Fresnel lens has a second Fresnel surface that includes a plurality of Fresnel structures and a second non-Fresnel surface that is opposite to the second Fresnel surface (e.g., lens 504-2 has surface 506-3 that includes a plurality of Fresnel structures and surface 506-4 that is opposite to surface 506-3 in FIG. 5).

In some embodiments, the first non-Fresnel surface is an aspheric surface and the second non-Fresnel surface is an aspheric surface (e.g., surfaces 506-2 and 506-4 are aspheric surfaces in FIG. 5).

In some embodiments, the first Fresnel lens defines a first optical axis. The first optical axis is distinct and separate from a geometric center of the first Fresnel lens (e.g., lens 504-1 defines optical axis 514-1 that is distinct and separate from a geometric center of lens 504-1). The second Fresnel lens defines a second optical axis. The second optical axis is distinct and separate from a geometric center of the second Fresnel lens (e.g., lens 504-2 defines optical axis 514-2 that is distinct and separate from a geometric center of lens 504-2).

In some embodiments, the first set of one or more display elements is separated from the second set of one or more display elements by at least 3 mm. For example, display 502-1 is separated from display 502-2 by at least 3 mm in FIG. 5. In some embodiments, the first set of one or more display elements is separated from the second set of one or more display elements by at least 4 mm. In some embodiments, the first set of one or more display elements is separated from the second set of one or more display elements by at least 5 mm. In some embodiments, the first set of one or more display elements is separated from the second set of one or more display elements by at least 6 mm. In some embodiments, the first set of one or more display elements is separated from the second set of one or more display elements by at least 7 mm. In some embodiments, the first set of one or more display elements is separated from the second set of one or more display elements by at least 8 mm.

In some embodiments, the third plane is parallel to the first plane, and the fourth plane is parallel to the second plane. For example, the third plane defined by lens 504-1 is parallel to the first plane defined by display 502-2, and the fourth plane defined by lens 504-2 is parallel to the second plane defined by display 502-2 in FIG. 5.

In some embodiments, the first plane intersects with the second plane at an angle that is at least 2 degrees. For example, the first plane defined by display 502-1 intersects with the second plane defined by display 502-2 at an angle of 12 degrees illustrated with angle C in FIG. 5. In some embodiments, the first plane intersects with the second plane at angle that is at least 4 degrees. In some embodiments, the first plane intersects with the second plane at angle that is at least 6 degrees. In some embodiments, the first plane intersects with the second plane at angle that is at least 8 degrees. In some embodiments, the first plane intersects with the second plane at angle that is at least 10 degrees. In some embodiments, the first plane intersects with the second plane at angle that is at least 12 degrees. In some embodiments, the first plane intersects with the second plane at angle that is at least 14 degrees. In some embodiments, the first plane intersects with the second plane at angle that is at least 16 degrees. In some embodiments, the first plane intersects with the second plane at angle that is at least 18 degrees. In some embodiments, the first plane intersects with the second plane at angle that is at least 20 degrees. In some embodiments, the first plane intersects with the second plane at angle that is at least 22 degrees. In some embodiments, the first plane intersects with the second plane at angle that is at least 24 degrees. In some embodiments, the first plane intersects with the second plane at angle that is at least 26 degrees. In some embodiments, the first plane intersects with the second plane at angle that is at least 28 degrees. In some embodiments, the first plane intersects with the second plane at angle that is at least 30 degrees. In some embodiments, the first plane intersects with the second plane at angle that is at least 32 degrees.

In some embodiments, the first plane intersects with the second plane at an angle that is not more than 30 degrees (e.g., angle C of FIG. 5). In some embodiments, the first plane intersects with the second plane at angle that is not more than 28 degrees. In some embodiments, the first plane intersects with the second plane at angle that is not more than 26 degrees. In some embodiments, the first plane intersects with the second plane at angle that is not more than 24 degrees. In some embodiments, the first plane intersects with the second plane at angle that is not more than 22 degrees. In some embodiments, the first plane intersects with the second plane at angle that is not more than 20 degrees. In some embodiments, the first plane intersects with the second plane at angle that is not more than 18 degrees. In some embodiments, the first plane intersects with the second plane at angle that is not more than 16 degrees. In some embodiments, the first plane intersects with the second plane at angle that is not more than 14 degrees. In some embodiments, the first plane intersects with the second plane at angle that is not more than 12 degrees. In some embodiments, the first plane intersects with the second plane at angle that is not more than 10 degrees.

In some embodiments, the first set of one or more display elements defines a first display optical axis and the first set of one or more lenses defines a first lens optical axis (e.g., display 502-1 defines display optical axis 512-1 and lens 504-1 defines lens optical axis 514-1 in FIG. 5). The second set of one or more display elements defines a second display optical axis and the second set of one or more lenses defines a second lens optical axis (e.g., display 502-2 defines display optical axis 512-2 and lens 504-2 defines lens optical axis 514-2 in FIG. 5). The first display optical axis is laterally offset from the first lens optical axis away from the center of the device toward a first temporal direction by at least 1 mm (e.g., display optical axis 512-1 is laterally offset from lens optical axis 514-1 toward left by 2 mm). The second display optical axis is laterally offset from the second lens optical axis away from the center of the device toward a second temporal direction that is opposite to the first temporal direction by at least 1 mm (e.g., display optical axis 512-2 is laterally offset from lens optical axis 514-2 toward right by 2 mm).

In accordance with some embodiments, a method includes transmitting a first light pattern from a first set of one or more display elements and transmitting a second light pattern from a second set of one or more display elements (e.g., display 502-1 transmits rays 508-1, 508-2, and 508-3 and display 502-2 transmits rays 508-4, 508-5, and 508-6 in FIG. 5). The first set of one or more display elements defines a first plane and the second set of one or more display elements defining a second plane that is not parallel to the first plane. For example, display 502-1 defines a first plane and display 502-2 defines a second plane in FIG. 5. Display 502-2 is not parallel to display 502-1. The method also includes directing the first light pattern from the first set of one or more display elements toward a first eye of a user and directing the second light pattern from the second set of one or more display elements toward a second eye of the user. For example, lens 504-1 directs rays 508-1, 508-2, and 508-3 toward reference pupil 410-1 and lens 504-2 directs rays 508-4, 508-5, and 508-6 toward reference pupil 410-2. Reference pupil 410-1 corresponds to a left eye of a user and reference pupil 410-2 corresponds to a right eye of a user. The first set of one or more lenses defines a third plane and the second set of one or more lenses defines a fourth plane that is not parallel to the third plane (e.g., lens 504-1 defines a third plane and lens 504-2 defines a fourth plane that is not parallel to the third plane). The second set of one or more lenses is distinct and separate from the first set of one or more lenses (e.g., lens 504-2 is distinct and separate from lens 504-1).

In some embodiments, the first set of one or more lenses includes a first Fresnel lens and the second set of one or more lenses includes a second Fresnel lens that is distinct and separate from the first Fresnel lens (e.g., lens 504-1 and 504-2 of FIG. 5).

In some embodiments, the first Fresnel lens has a first Fresnel surface that includes a plurality of Fresnel structures (e.g., surface 506-1 in FIG. 5) and a first non-Fresnel surface that is opposite to the first Fresnel surface (e.g., surface 506-2 in FIG. 5). The second Fresnel lens has a second Fresnel surface that includes a plurality of Fresnel structures (e.g., surface 506-3 in FIG. 5) and a second non-Fresnel surface that is opposite to the second Fresnel surface (e.g., surface 506-4 in FIG. 5).

In some embodiments, the first non-Fresnel surface is an aspheric surface and the second non-Fresnel surface is an aspheric surface (e.g., surfaces 506-2 and 506-4 are aspheric surfaces in FIG. 5).

In some embodiments, the first Fresnel lens defines a first optical axis (e.g., optical axis 514-1 in FIG. 5). The first optical axis is distinct and separate from a geometric center of the first Fresnel lens. The second Fresnel lens defines a second optical axis (e.g., 514-2 in FIG. 5). The second optical axis is distinct and separate from a geometric center of the second Fresnel lens.

In some embodiments, the first set of one or more display elements is separated from the second set of one or more display elements by at least 3 mm (e.g., displays 502-1 and 502-2 in FIG. 5).

In some embodiments, the third plane is parallel to the first plane and the fourth plane is parallel to the second plane (e.g., lens 504-1 is parallel to display 502-2, and lens 504-2 is parallel to display 502-2 in FIG. 5).

In some embodiments, the first plane intersects with the second plane at an angle that is at least 2 degrees (e.g., angle C in FIG. 5).

In some embodiments, the first plane intersects with the second plane intersect at an angle that is not more than 30 degrees (e.g., angle C in FIG. 5).

In some embodiments, the first set of one or more display elements defines a first display optical axis and the first set of one or more lenses defines a first lens optical axis (e.g., display 502-1 defines display optical axis 512-1 and lens 504-1 defines lens optical axis 514-1 in FIG. 5). The second set of one or more display elements defines a second display optical axis and the second set of one or more lenses defines a second lens optical axis (e.g., display 502-2 defines display optical axis 512-2 and lens 504-2 defines lens optical axis 514-2 in FIG. 5). The first display optical axis is laterally offset from the first lens optical axis away from the center of the device toward a first temporal direction by at least 1 mm (e.g., display optical axis 512-1 is laterally offset from lens optical axis 514-1 toward left by 2 mm). The second display optical axis is laterally offset from the second lens optical axis away from the center of the device toward a second temporal direction that is opposite to the first temporal direction by at least 1 mm (e.g., display optical axis 512-2 is laterally offset from lens optical axis 514-2 toward right by 2 mm).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A head-mounted display device, comprising:
a first set of one or more display elements, the first set of one or more display elements defining a first plane;
a second set of one or more display elements, the second set of one or more display elements defining a second plane that is not parallel to the first plane; and
a first set of one or more lenses configured to transmit light from the first set of one or more display elements toward a first eye of a user, the first set of one or more lenses defining a third plane, wherein:
the first set of one or more display elements defines a first display optical axis;
the first set of one or more lenses defines a first lens optical axis;
the head-mounted display device has a reference axis;
the first set of one or more display elements is configured to project light toward a first reference pupil;
the first set of one or more display elements defining the first plane intersects a first reference pupil axis passing through a center of the first reference pupil and parallel to the reference axis;

the second set of one or more display elements is configured to project light toward a second reference pupil; and the second set of one or more display elements defining the second plane intersects a second reference pupil axis passing through a center of the second reference pupil and parallel to the reference axis.

2. The device of claim 1, wherein:
the first set of one or more lenses includes a first Fresnel lens.

3. The device of claim 2, wherein:
the first Fresnel lens has a first Fresnel surface that includes a plurality of Fresnel structures and a first non-Fresnel surface that is opposite to the first Fresnel surface.

4. The device of claim 3, wherein:
the first non-Fresnel surface is an aspheric surface.

5. The device of claim 2, wherein:
the first Fresnel lens defines a first optical axis, the first optical axis being distinct and separate from a geometric center of the first Fresnel lens.

6. The device of claim 1, wherein:
the first display optical axis is laterally offset from the first lens optical axis away from the center of the device toward the first temporal direction by at least 1 mm.

7. The device of claim 1, wherein:
the third plane is parallel to the first plane.

8. The device of claim 1, wherein:
the first plane intersects with the second plane at an angle that is at least 2 degrees.

9. The device of claim 1, wherein:
the first plane intersects with the second plane at an angle that is not more than 30 degrees.

10. The device of claim 1, further including:
a second set of one or more lenses configured to transmit light from the second set of one or more display elements toward a second eye of the user, the second set of one or more lenses being distinct and separate from the first set of one or more lenses, the second set of one or more lenses defining a fourth plane that is not parallel to the third plane, wherein:
the second set of one or more display elements defines a second display optical axis; and
the second set of one or more lenses defines a second lens optical axis.

11. A method, comprising:
transmitting a first light pattern from a first set of one or more display elements, the first set of one or more display elements defining a first plane;
transmitting a second light pattern from a second set of one or more display elements, the second set of one or more display elements defining a second plane that is not parallel to the first plane; and
directing, with a first set of one or more lenses, the first light pattern from the first set of one or more display elements toward a first eye of a user, the first set of one or more lenses defining a third plane, wherein:
the first set of one or more display elements defines a first display optical axis;
the first set of one or more lenses defines a first lens optical axis;
the head-mounted display device has a reference axis;
the first set of one or more display elements is configured to project light toward a first reference pupil;
the first set of one or more display elements defining the first plane intersects a first reference pupil axis passing through a center of the first reference pupil and parallel to the reference axis;
the second set of one or more display elements is configured to project light toward a second reference pupil; and
the second set of one or more display elements defining the second plane intersects a second reference pupil axis passing through a center of the second reference pupil and parallel to the reference axis.

12. The method of claim 11, wherein:
the first set of one or more lenses includes a first Fresnel lens.

13. The method of claim 12, wherein:
the first Fresnel lens has a first Fresnel surface that includes a plurality of Fresnel structures and a first non-Fresnel surface that is opposite to the first Fresnel surface.

14. The method of claim 13, wherein:
the first non-Fresnel surface is an aspheric surface.

15. The method of claim 12, wherein:
the first Fresnel lens defines a first optical axis, the first optical axis being distinct and separate from a geometric center of the first Fresnel lens.

16. The method of claim 11, wherein:
the first display optical axis is laterally offset from the first lens optical axis away from the center of the device toward the first temporal direction by at least 1 mm.

17. The method of claim 11, wherein:
the third plane is parallel to the first plane.

18. The method of claim 11, wherein:
the first plane intersects with the second plane intersect at an angle that is at least 2 degrees.

19. The method of claim 11, wherein:
the first plane intersects with the second plane intersect at an angle that is not more than 30 degrees.

20. The method of claim 11, further including:
directing, with a second set of one or more lenses, the second light pattern from the second set of one or more display elements toward a second eye of the user, the second set of one or more lenses being distinct and separate from the first set of one or more lenses, the second set of one or more lenses defining a fourth plane that is not parallel to the third plane, wherein:
the second set of one or more display elements defines a second display optical axis; and
the second set of one or more lenses defines a second lens optical axis.

* * * * *

UNITED STATES PATENT AND TRADEMARK OFFICE
CERTIFICATE OF CORRECTION

PATENT NO. : 10,514,544 B1
APPLICATION NO. : 15/801227
DATED : December 24, 2019
INVENTOR(S) : Yoon Page 1 of 1

It is certified that error appears in the above-identified patent and that said Letters Patent is hereby corrected as shown below:

In the Claims

Claim 1, Column 18, Line 55, please delete "first eye of a user," and insert --first reference pupil,--;

Claim 1, Column 18, Line 63, please delete "toward a first" and insert --toward the first--;

Claim 10, Column 19, Line 37, please delete "toward a second eye of the user," and insert --toward the second reference pupil,--;

Claim 11, Column 20, Line 7, please delete "toward a first" and insert --toward the first--;

Claim 20, Column 20, Line 48, please delete "toward a second eye of the user," and insert --toward the second reference pupil,--.

Signed and Sealed this
Tenth Day of March, 2020

Andrei Iancu
*Director of the United States Patent and Trademark Office*